United States Patent
Wang et al.

(12) United States Patent (10) Patent No.: US 11,206,349 B2
(45) Date of Patent: Dec. 21, 2021

(54) VIDEO PROCESSING METHOD, APPARATUS AND MEDIUM

(71) Applicant: BEIJING XIAOMI MOBILE SOFTWARE CO., LTD., Beijing (CN)

(72) Inventors: Qian Wang, Beijing (CN); Junzeng Du, Beijing (CN); Chong Jia, Beijing (CN); Xuman Luo, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 19 days.

(21) Appl. No.: 16/805,784

(22) Filed: Mar. 1, 2020

(65) Prior Publication Data
US 2021/0099644 A1 Apr. 1, 2021

(30) Foreign Application Priority Data

Sep. 26, 2019 (CN) .......................... 201910918070.8

(51) Int. Cl.
*H04N 5/232* (2006.01)

(52) U.S. Cl.
CPC ..... *H04N 5/23229* (2013.01); *H04N 5/23296* (2013.01); *H04N 5/232935* (2018.08); *H04N 5/232939* (2018.08)

(58) Field of Classification Search
CPC .......... H04N 5/23229; H04N 5/23248; H04N 5/232935; H04N 5/232939; H04N 5/23296; H04N 5/2628
See application file for complete search history.

(56) References Cited

U.S. PATENT DOCUMENTS

| | | | | |
|---|---|---|---|---|
| 9,992,449 B1* | 6/2018 | Ashkenazi | ............. | G06F 1/163 |
| 10,110,814 B1* | 10/2018 | Day | ...................... | G06T 3/0018 |
| 10,863,112 B1* | 12/2020 | He | ..................... | H04N 5/23238 |
| 2007/0035617 A1* | 2/2007 | Ko | ............................ | G06T 7/20 |
| | | | | 348/37 |
| 2007/0174774 A1* | 7/2007 | Lerman | .................. | H04L 67/34 |
| | | | | 715/723 |
| 2007/0296837 A1* | 12/2007 | Morita | ................... | H04N 3/155 |
| | | | | 348/240.99 |
| 2012/0033100 A1* | 2/2012 | Harikae | ............... | H04N 5/2628 |
| | | | | 348/223.1 |
| 2013/0055087 A1* | 2/2013 | Flint | .................. | G06F 3/04883 |
| | | | | 715/723 |
| 2013/0071031 A1 | 3/2013 | Huang et al. | | |

(Continued)

OTHER PUBLICATIONS

Extended European Search Report (EESR) in Application No. 20161094.6 dated Jun. 10, 2021.

*Primary Examiner* — Chiawei Chen
(74) *Attorney, Agent, or Firm* — Syncoda LLC; Feng Ma (57) ABSTRACT

A method for processing videos includes: N videos are collected, wherein N is a positive integer larger than or equal to 1; at least one image frame in the N videos is selected, an image display mode of the selected at least one image frame is changed and image display data is obtained, wherein the image display data is a part of data included in the image frame; and a new video is generated by using the image display data of selected at least one image frame of which image display mode is changed. As such, the video capturing effect is less affected by moving the camera during capturing, and dynamic effects of moving capturing can be realized.

18 Claims, 7 Drawing Sheets

(56) References Cited

U.S. PATENT DOCUMENTS

| | | | | |
|---|---|---|---|---|
| 2013/0089301 A1* | 4/2013 | Ju | ............... | H04N 9/8205 386/241 |
| 2014/0140677 A1* | 5/2014 | Cho | ............ | H04N 5/23229 386/230 |
| 2014/0245367 A1* | 8/2014 | Sasaki | ............ | H04N 21/6175 725/109 |
| 2014/0320702 A1* | 10/2014 | Tsubusaki | ...... | H04N 5/23219 348/240.3 |
| 2015/0243326 A1* | 8/2015 | Pacurariu | ....... | G06F 16/7834 386/280 |
| 2016/0050368 A1* | 2/2016 | Seo | ............ | H04N 5/23238 348/36 |
| 2016/0080835 A1* | 3/2016 | von Sneidern | .. | H04N 21/44008 386/282 |
| 2016/0093272 A1* | 3/2016 | Shiraga | ............ | G09G 5/38 345/649 |
| 2019/0012818 A1* | 1/2019 | Fine | ............ | H04N 5/23296 |
| 2019/0348075 A1* | 11/2019 | Derbanne | ....... | H04N 5/2621 |
| 2021/0099644 A1* | 4/2021 | Wang | ............ | H04N 5/232939 |

* cited by examiner

VIDEO PROCESSING METHOD, APPARATUS AND MEDIUM

CROSS-REFERENCE TO RELATED APPLICATION

This application claims priority to Chinese Patent Application No. 201910918070.8 filed on Sep. 26, 2019, the disclosure of which is hereby incorporated by reference in its entirety.

BACKGROUND

With the improvement of Internet technologies and the increasing speed of network transmission, the media have changed from simple text to various ways such as images and videos. Videos have gradually become a way of expressing a user's life and mood. As a result, a variety of video capturing methods including moving lens capturing have been produced. Moving lens capturing means that a camera captures videos or images while the lens in motion.

During capturing videos, ordinary camera users often use methods of moving lens capturing, such as pushing lens, pulling lens, tilting lens, moving lens, etc., in order to enhance dynamic effects of the videos. However, due to the non-professional nature of ordinary users, when they move the lens for capturing, effects of video capturing will be affected due to the reasons such as camera shaking.

SUMMARY

Various embodiments of the present disclosure provide a method, device, and medium for processing videos.

According to a first aspect of the present disclosure, a method for processing a video is provided, including:
collecting N videos, wherein N is a positive integer larger than or equal to 1;
selecting at least one image frame in the N videos, changing an image display mode of the selected at least one image frame and obtaining image display data, wherein the image display data is a part of data included in the image frame; and
generating a new video by using the image display data of selected at least one image frame whose image display mode is changed.

The image display mode includes at least one of the following: an image zoom factor, an image display range and an image display rotation angle.

When the image display range of the selected at least one image frame is changed, a center position point of a display frame corresponding to the image display range is caused to move along a set curve on a plane rectangular coordinate system corresponding to the image frame.

When an image display rotation angle of the selected at least one image frame is changed, the display frame corresponding to the image display range is caused to rotate around a set point in the display frame in a set direction by a set angle.

The generating a new video by using the image display data includes:
using image display data of all or a part of the image frames whose image display modes are not changed in an i-th video and image display data of all the image frames whose image display modes are changed in the i-th video, to generate a sub-video corresponding to the i-th video, wherein i=1, 2, . . . , N; and
generating the new video by using the sub-video.

The generating the new video by using the sub-video includes:
taking the sub-video as the new video, when N is equal to 1; and
composing the N sub-videos into the new video in a set order, when N is greater than or equal to 2.

The collecting N videos includes:
using a video collecting device that meets at least one of the following conditions to collect the N videos:
condition one: a capturing lens having a viewing angle range greater than a set range; and
condition two: a capturing lens having a resolution greater than a set threshold.

According to a second aspect of the present disclosure, a device for processing a video is provided and the device includes:
a processor; and
a memory for storing a computer program that, when executed by the processor, causes the processor to:
collect N videos, wherein N is a positive integer greater than or equal to 1;
select at least one image frame in the N videos and change an image display mode of the selected at least one image frame;
obtain image display data of an image frame whose image display mode is changed, wherein the image display data is a part of data included in the image frame; and
generate a new video by using the image display data of the selected at least one image frame whose image display mode is changed.

The image display mode includes at least one of the following: an image zoom factor, an image display range and an image display rotation angle.

The computer program further causes the processor to:
cause a center position of a display frame corresponding to the image display range to move along a set curve on a plane rectangular coordinate system corresponding to the image frame, when the image display range of the selected at least one image frame is changed; and
cause the display frame corresponding to the image display range to rotate around a set point in the display frame in a set direction by a set angle, when the image display rotation angle of the selected at least one image frame is changed.

The computer program further causes the processor to:
generate a sub-video corresponding to the i-th video by using the image display data of all or a part of the image frames whose image display modes are not changed in the i-th video, and the image display data of all the image frames whose image display modes are changed in the i-th video, where i=1, 2, . . . , N; and
generate the new video by using the sub-video.

The computer program further causes the processor to:
take the sub-video as the new video, when N is equal to 1; and
compose N sub-videos into the new video in a set order, when N is greater than or equal to 2.

The computer program further causes the processor to:
use a video collecting device that meets at least one of the following conditions to collect the N videos:
condition one: a capturing lens having a viewing angle range greater than a set range; and
condition two: a capturing lens having a resolution greater than a set threshold.

According to a third aspect of the present disclosure, a non-transitory computer-readable storage medium is provided, when a computer program stored in the storage medium are executed by a processor of a mobile terminal, causes the processor to:

collect N videos, wherein N is a positive integer larger than or equal to 1;

select at least one image frame in the N videos, change an image display mode of the selected at least one image frame and obtain image display data, wherein the image display data is a part of data included in the image frame; and generate a new video by using the image display data of selected at least one image frame whose image display mode is changed.

It should be understood that the above general descriptions and the following detailed descriptions are merely exemplary and explanatory, and should not limit the present disclosure.

BRIEF DESCRIPTION OF THE DRAWINGS

The drawings herein, which are incorporated into a specification and constitute a part of the disclosure, illustrate embodiments consistent with the present disclosure, and serve to explain principles of the present disclosure together with the specification.

DETAILED DESCRIPTION

Exemplary embodiments will be described in detail here, examples of which are illustrated in the drawings. When the following descriptions relate to the drawings, the same numerals in different drawings represent the same or similar elements unless otherwise indicated. The implementations described in the following exemplary embodiments do not represent all implementations consistent with the present disclosure. Rather, they are merely examples of device and methods consistent with some aspects of the present disclosure and what is elaborated in the appended claims.

During capturing videos, ordinary camera users often use methods of moving lens capturing, such as pushing lens, pulling lens, panning lens, moving lens, etc., in order to enhance dynamic effects of the videos. However, due to the non-professional nature of ordinary users, when they move the lens for capturing, effects of video capturing will be affected due to the reasons such as camera shaking.

The present disclosure provides a method for obtaining a video with dynamic effects by processing videos captured by a still camera. In this method, the user keeps the camera still for capturing videos and then processes these videos for dynamic effects to simulate the capturing effects of camera moving capturing, and at the same time the problem of poor capturing effects caused by the user moving the camera while capturing can be overcome.

The method of the present disclosure can be used on a camera or a smart terminal provided with a camera, such as a mobile phone or a PAD.

Figure 1:
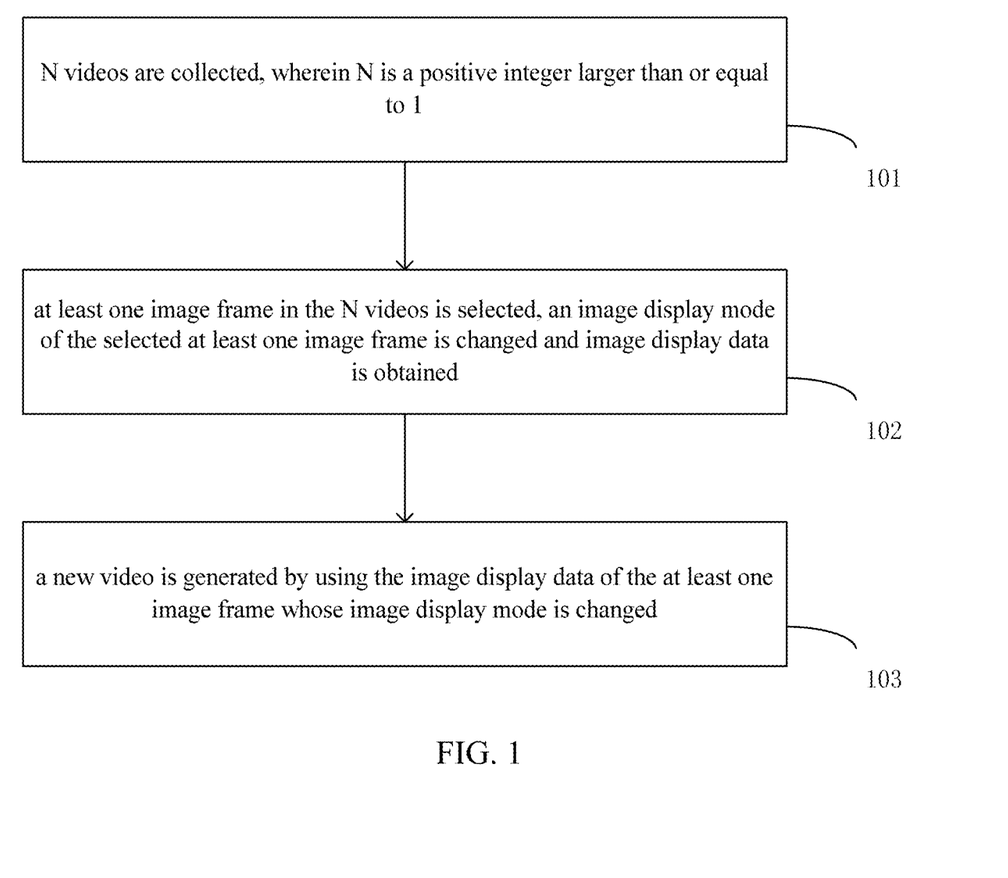
FIG. 1 is a flowchart showing a method for processing videos according to an exemplary embodiment.

FIG. 1 is a flowchart showing a method for processing a video according to an exemplary embodiment. As shown in FIG. 1, the method includes the following steps.

In step 101, N videos are collected, wherein N is a positive integer larger than or equal to 1.

In step 102, at least one image frame in the N videos is selected, an image display mode of the selected at least one image frame is changed and image display data is obtained, wherein the image display data is a part of data included in the image frame.

In step 103, a new video is generated by using the image display data of the at least one image frame whose image display mode is changed.

In step 101, one or more videos can be collected. In a case that several videos are collected, the new video generated at last is a video composed by the several processed videos.

In step 102, the collected videos are processed. Here, all the collected N videos may be processed, or several videos may be selected from the N videos for processing. In addition, all image frames in a video may be processed, or only some image frames in the video are processed. The processing here is to change the image display mode of the image frame. In addition, the image display data in this step is the image display data the image frame with the image display mode being changed.

In the method shown in FIG. 1, after all or part of the image frames in the videos are processed, a new video is generated by using these processed image frames so that the generated new video has effects of moving capturing. Since the original video collected here may be captured while keeping the camera still, the problem of the capturing effects being affected by camera shaking can be overcome, wherein the camera shaking may be caused by the users moving the camera during capturing. At the same time, due to the processing of the image frames in the videos, when the processed image frames are used to generate a new video, the new video has the effects of moving capturing. That is, the method of the present disclosure can not only overcome the problem of affecting the capturing effects due to moving the camera during capturing, but also achieve the dynamic effects of moving capturing.

The following describes how to obtain the new video having the moving capturing effect by processing the image frames.

In an optional implementation manner, the image display mode includes at least one of the following: an image zoom factor, an image display range and an image display rotation angle.

It should be noted that the image frame is actually a static image, so the processing of the image frame is actually the processing of the static image. Specifically, changes to the image display mode of the image frame include changes to the image zoom factor, the image display range and the image display rotation angle of the image frame.

A change to the image zoom factor can have an effect of zooming out and zoom in the image. Zooming out and zoom in the image correspond to operations of pulling or pushing the lens, thereby simulating the effect of zooming capturing. When capturing a video, a super wide-angle lens with high resolution can be used for capturing. In this way, when the image zoom factor of the image frame in the captured video is changed, a complete image can still be clearly displayed.

A change to the image display range corresponds to an operation of moving the camera, thereby simulating the effect of moving capturing. During capturing a video, the super wide-angle lens is used for capturing and thus the image frame is a wide frame. A viewing angle range of a screen which plays the new video is smaller than that of the capturing lens which captures the video, and thus different parts of image can be selected for displaying from the wide image frame picture, and the effect of moving capturing is realized.

A change to the image display rotation angle corresponds to an operation of rotating a camera lens, thereby simulating the effect that the camera lens is rotated for capturing. For example, when capturing a person, if the camera lens is not rotated, the person in the image is perpendicular to a lower border of an image display frame; and when the camera lens is rotated for capturing, the person in the image and the lower border of the image display frame form an angle smaller than a right angle.

As can be seen from the above descriptions, the effect of simulating a moving camera for capturing can be achieved by changing the image zoom factor, image display range and image display rotation angle of the image frame. In addition, according to the specific processing requirements, the above three ways of changing the image display mode can be combined to achieve different capturing effects of simulating camera moving capturing.

In an optional embodiment, when the image display range of the selected at least one image frame is changed, a center position point of a display frame corresponding to the image display range is caused to move along a set curve on a plane rectangular coordinate system corresponding to the image frame. When an image display rotation angle of the selected at least one image frame is changed, the display frame corresponding to the image display range is caused to rotate around a set point in the display frame in a set direction by a set angle.

The image display range corresponds to a display screen for playing the generated new video. Since the viewing angle range of the display screen is smaller than that of the lens that captures the video, the image display range is smaller than the image size of the image frame. As described above, when the image display range of an image frame is changed, the different parts of image are selected for display from the image frame picture and this can be achieved by the following operations: the center position point of the display frame corresponding to the image display range is made to move along a set curve on a plane rectangular coordinate system corresponding to the image frame.

Figure 2:
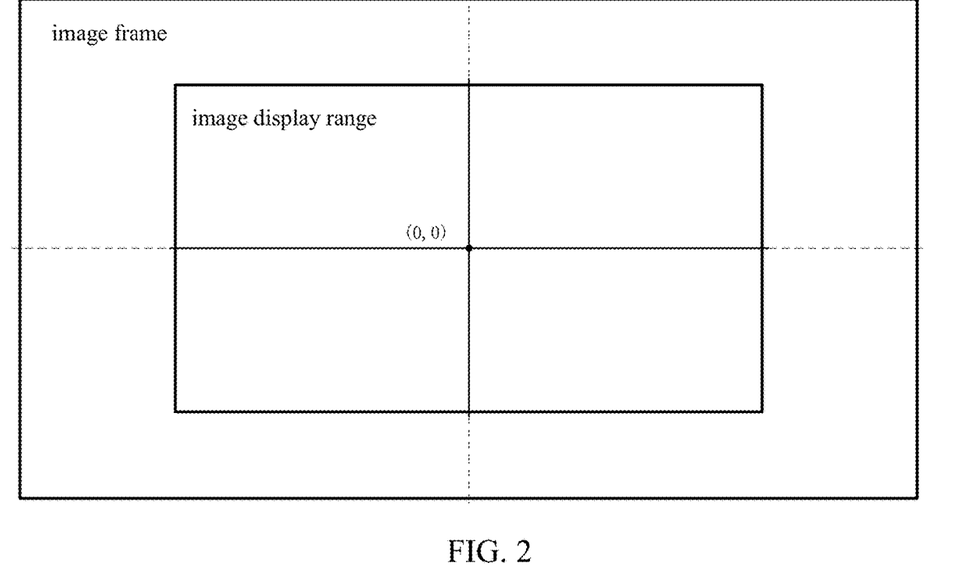
FIG. 2 is a schematic view showing a position of a center position point of a display frame corresponding to an image display range on a plane rectangular coordinate system corresponding to an image frame according to an exemplary embodiment.
Figure 3:
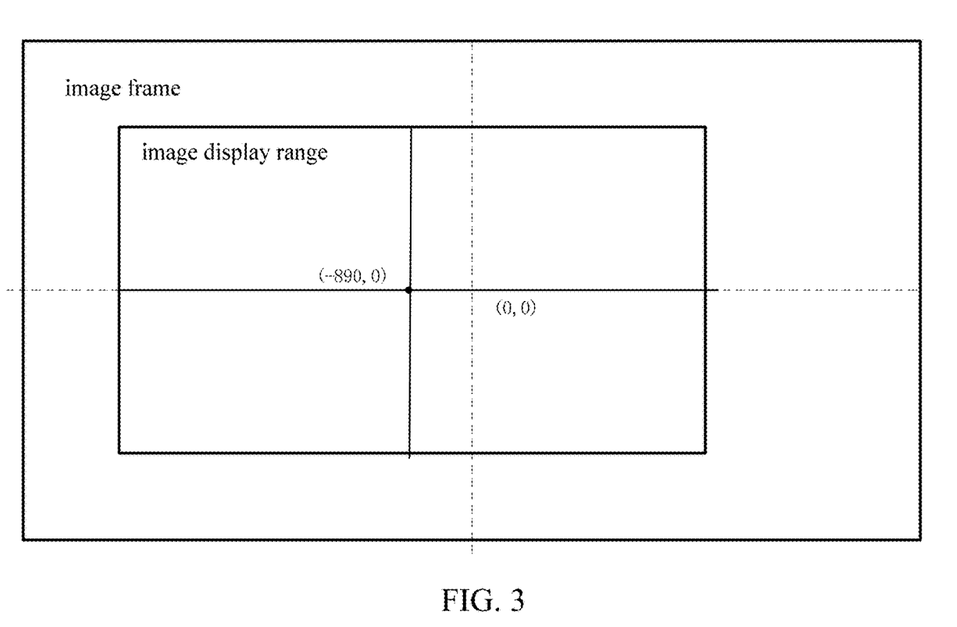
FIG. 3 is a schematic view showing a position of a center position point of a display frame corresponding to an image display range on a plane rectangular coordinate system corresponding to an image frame according to an exemplary embodiment.
Figure 4:
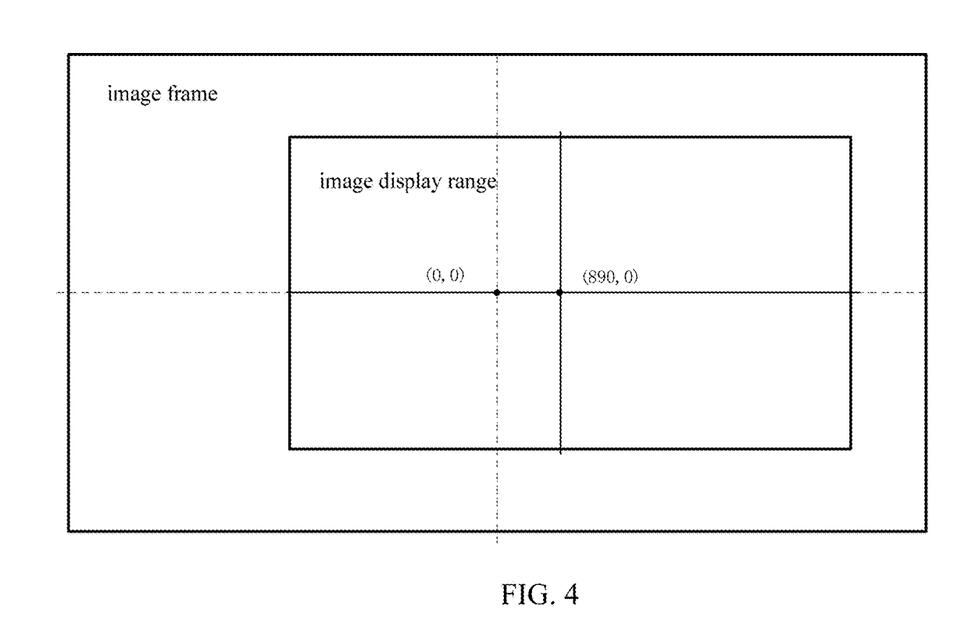
FIG. 4 is a schematic view showing a position of a center position point of a display frame corresponding to an image display range on a plane rectangular coordinate system corresponding to an image frame according to an exemplary embodiment.

For example, when the image display range of the image frame is not changed, the center position of the display frame corresponding to the image display range is located at the origin (0, 0) of the plane rectangular coordinate system corresponding to the image frame, as shown in FIG. 2. When the image display range of the image frame is changed, if the center position of the display frame corresponding to the image display range is located at the point (−890, 0) of the plane rectangular coordinate system corresponding to the image frame, as shown in FIG. 3, this situation is equivalent to moving the camera lens to the left; and if the center position of the display frame corresponding to the image display range is located at the point (890, 0) in the plane rectangular coordinate system corresponding to the image frame, as shown in FIG. 4, this situation is equivalent to moving the camera lens to the right. When the center position of the display frame corresponding to the image display range is moved from the point (−890, 0) to the point (890, 0) on the plane rectangular coordinate system corresponding to the image frame, the movement of the camera lens from left to right is thus simulated. It should be noted that the coordinates here are the corresponding pixel coordinates.

When the center positions of the display frames corresponding to the image display ranges of the multiple image frames are located at points evenly distributed on a straight line on the plane rectangular coordinate system corresponding to the image frames, the video generated by the image display data of the multiple image frames simulates the operation of moving the lens at a constant speed. When the center position of each display frame is located at a non-uniformly distributed point on a straight line on the plane rectangular coordinate system, the video generated by the image display data of the multiple image frames simulates the operation of moving the lens at a non-constant speed.

Figure 5:
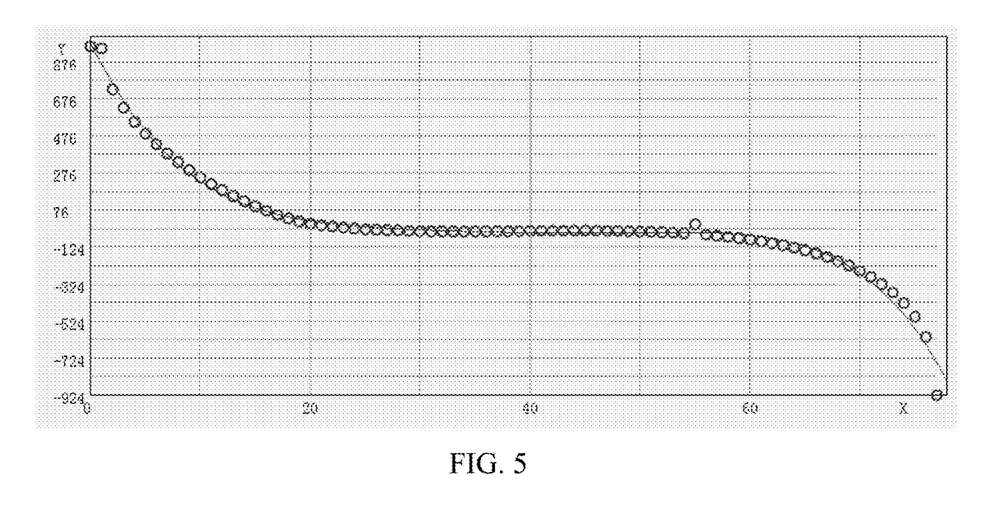
FIG. 5 is a schematic diagram showing a motion curve of a center position point of a display frame corresponding to an image display range on a plane rectangular coordinate system corresponding to an image frame according to an exemplary embodiment.

When the center position point of the display frame moves along a set curve on a plane rectangular coordinate system corresponding to the image frame, it may move along the X or Y axis, or it may move along a straight line which forms a set angle with the X or Y axis, or it may also move along a set curve in a plane rectangular coordinate system, such as the curve shown in FIG. 5. The movement along the curve can simulate the capturing effect that the camera lens moves in various directions with the speed of the movement being changed randomly.

When the image display rotation angle of the image frame is not changed, the horizontal border of the display frame corresponding to the image display range and the X-axis (or Y-axis) of the plane rectangular coordinate system corresponding to the image frame form a set initial angle. For example, in FIG. 2, the angle between the horizontal border of the display frame and the X-axis of the plane rectangular coordinate system is 0 degree. When the image display rotation angle of the image frame is changed, the angle between the horizontal border of the display frame corresponding to the image display range and the X-axis (or Y-axis) of the plane rectangular coordinate system corresponding to the image frame changes, as shown in FIG. 6.

Figure 6:
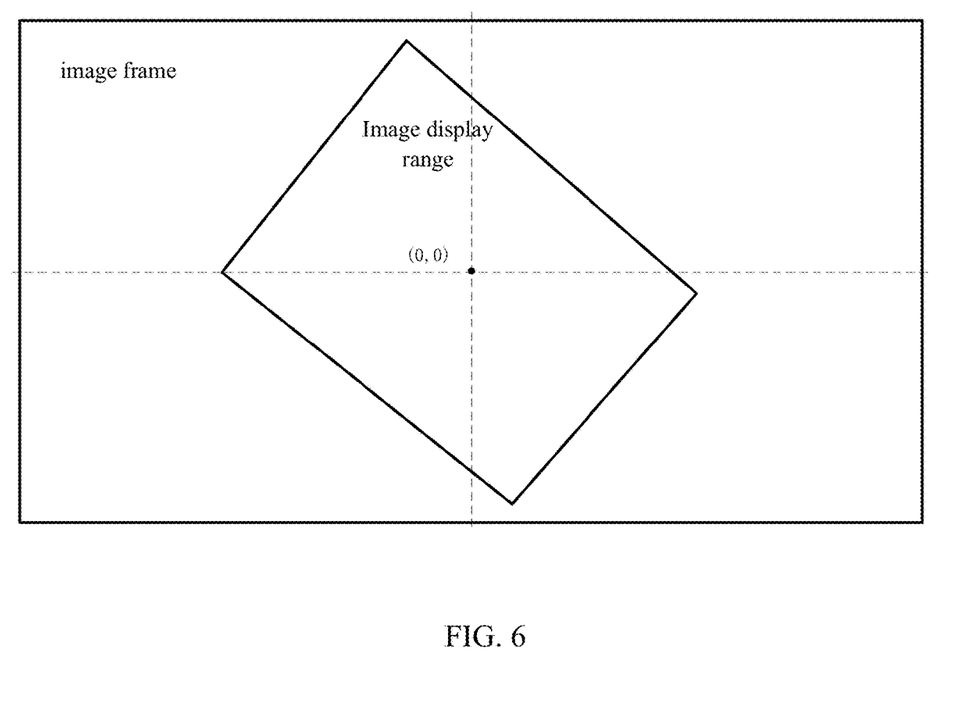
FIG. 6 is a schematic diagram showing a rotation of a display frame corresponding to an image display range on a plane rectangular coordinate system corresponding to an image frame according to an exemplary embodiment.

FIG. 6 is obtained by rotating the display frame in FIG. 2 by a set angle around its center position. It is conceivable that the display frame can also be obtained by rotating the original display frame around any point within it, such as rotating around a vertex thereof. The rotation angles of adjacent image frames in sequence can be the same or different to simulate different lens rotation effects.

Similarly, if the zoom factors of several adjacent image frames are an equal difference series, the capturing process that pushing lens and pulling lens are at a constant speed is simulated.

In an optional implementation manner, that a new video is generated by using the image display data includes:

the image display data of all or a part of the image frames whose image display modes are not changed in an i-th video and the image display data of all the image frames whose image display modes are changed in the i-th video are used, and a sub-video corresponding to the i-th video is generated, wherein i=1, 2, . . . , N; and the new video is generated by using the sub-video.

As described above, when videos are processed, all the videos in the multiple videos may be selected for processing, or some of the videos in the multiple videos may be selected for processing. When one video is processed, all the image frames in the video may be processed, or some image frames in the video may also be selected for processing.

When a new video is generated after processing a video, image frames that have been processed and image frames that have not been processed in the video are used to generate the new video. When a new video is generated, the new video can be generated by all the image frames whose image display modes are not changed together with the image frames whose image display modes are changed. In this case, the new video includes the same number of image frames as that of the original video, that is, the play time of the new video is as same as that of the original video. If the new video is generated by the image frames whose image display modes are changed and only a part of image frames whose image display modes are not changed, the number of image frames included in the new video is less than the number of image frames of the original video, that is, the play time of the new video is shorter than the play time of the original video.

In an optional implementation manner, the new video is generated by using the sub-video includes:

when N is equal to 1, the sub-video is taken as the new video; and

When N is greater than or equal to 2, the N sub-videos are composed into the new video in a set order.

When only one video is collected, a new video is generated after image frames in the video are processed. When multiple videos are collected, N sub-videos are generated after the image frames are processed, and then the N sub-videos are composed into a new video. When a new video is composed, the N sub-videos can be composed in a certain order as required to achieve different play effects. For example, video composing can be performed in the original order of N videos, or in a random order.

In an optional implementation manner, collecting N videos includes using a video collecting device that meets at least one of the following conditions to collect the N videos:

condition one: a capturing lens having a viewing angle range greater than a set range; and condition two: a capturing lens having a resolution greater than a set threshold.

When the foregoing operation of changing the image display mode is performed, if the lens of the camera meets the set requirements, a better processing effect can be achieved. For example, when the image zoom factor is changed, the resolution of the lens is required to be greater than a set threshold, such as using a 4K ultra high-definition lens. In this way, when the image of the image frame is enlarged, the image definition can still be guaranteed to meet the requirements. For another example, when the image display range is changed, the viewing angle range of the lens is required to be larger than the set range, such as using an ultra-wide-angle lens. In this way, different display ranges can be selected in the picture of the image frame.

Figure 7:
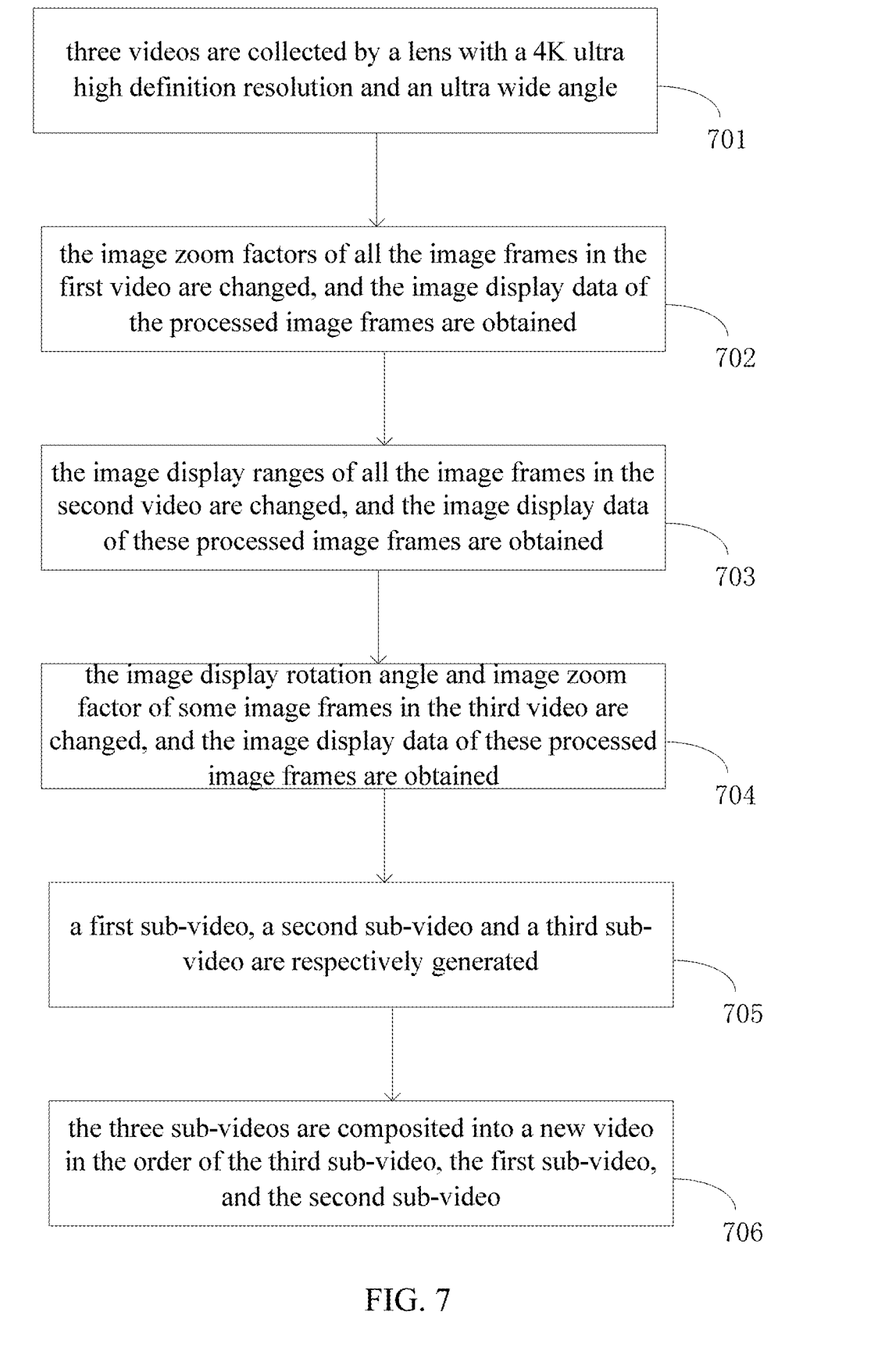
FIG. 7 is a flowchart showing a method for processing videos according to an exemplary embodiment.

FIG. 7 illustrates a specific embodiment of a method according to the present disclosure, and the method includes the following steps.

In step 701: three videos are collected by a lens with a 4K ultra high definition resolution and an ultra wide angle.

In step 702: the image zoom factors of all the image frames in the first video are changed, and the image display data of the processed image frames are obtained.

In step 703: the image display ranges of all the image frames in the second video are changed, and the image display data of these processed image frames are obtained.

In step 704: the image display rotation angle and image zoom factor of some image frames in the third video are changed, and the image display data of these processed image frames are obtained.

In step 705: a first sub-video, a second sub-video and a third sub-video are respectively generated.

In step 706: the three sub-videos are composed into a new video in the order of the third sub-video, the first sub-video, and the second sub-video.

After the video is composed by using the above method, the composed video can be released on a social media platform, and the released video can show dynamic scenes as if captured at different times and places.

Figure 8:
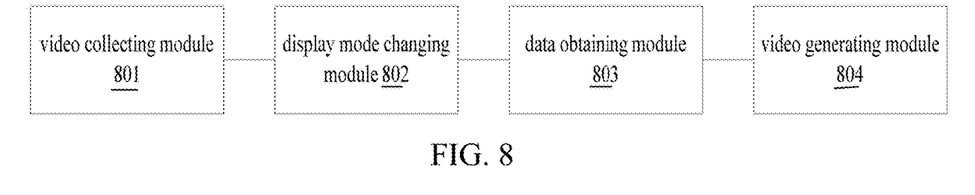
FIG. 8 is a block diagram of a device for processing videos according to an exemplary embodiment.

A device for processing a video is further provided by the present disclosure, as shown in FIG. 8. The device includes a video collecting module 801, a display mode changing module 802, a data obtaining module 803 and a video generating module 804.

The video collecting module 801 is configured to collect N videos, wherein N is a positive integer greater than or equal to 1.

The display mode changing module 802 is configured to select at least one image frame in the N videos and change an image display mode of the selected at least one image frame.

The data obtaining module 803 is configured to obtain image display data of an image frame whose image display mode is changed, and the image display data is a part of data included in the image frame.

The video generating module 804 is configured to generate a new video by using the image display data of the selected at least one image frame whose image display mode is changed.

In an optional implementation manner, the image display mode includes at least one of the following: an image zoom factor, an image display range and an image display rotation angle.

In an optional implementation manner, the display mode changing module 802 is further configured to:

cause a center position of a display frame corresponding to the image display range to move along a set curve on a plane rectangular coordinate system corresponding to the image frame, when the image display range of the selected at least one image frame is changed; and cause the display frame corresponding to the image display range to rotate around a set point in the display frame in a set direction by a set angle, when the image display rotation angle of the selected at least one image frame is changed.

In an optional implementation manner, the video generating module 804 is further configured to:

generate a sub-video corresponding to the i-th video by using the image display data of all or a part of the image frames whose image display modes are not changed in the i-th video, and the image display data of all the image frames whose image display modes are changed in the i-th video, where i=1, 2, . . . , N; and generate the new video by using the sub-video.

In an optional implementation manner, the video generating module 804 is further configured to:

take the sub-video as the new video, when N is equal to 1; and compose N sub-videos into the new video in a set order, when N is greater than or equal to 2.

In an optional implementation manner, the video collecting module 801 is further configured to:

use a video collecting device that meets at least one of the following conditions to collect the N videos:

condition one: a capturing lens having a viewing angle range greater than a set range; and condition two: a capturing lens having a resolution greater than a set threshold.

Regarding the device in the foregoing embodiment, the specific manner in which each module performs operations has been described in detail in the embodiment of the method, and will not be described in detail here.

In the method of the present disclosure, after all or a part of image frames in videos are processed, a new video is generated by using the processed image frames, so that the generated new video has effects of moving capturing. Since the original videos collected here can be taken by keeping the camera still, the problem of the capturing effects being affected by camera shaking can be overcome, wherein the camera shaking may be caused by the users moving the camera during capturing. At the same time, due to the processing of the image frames in the videos, if a new video is generated by using the processed image frames, the new video has the effects of moving capturing. That is, the method of the present disclosure can not only overcome the problem of the capturing effects being affected due to moving the camera during capturing, but also achieve the dynamic effects by moving capturing.

Figure 9:
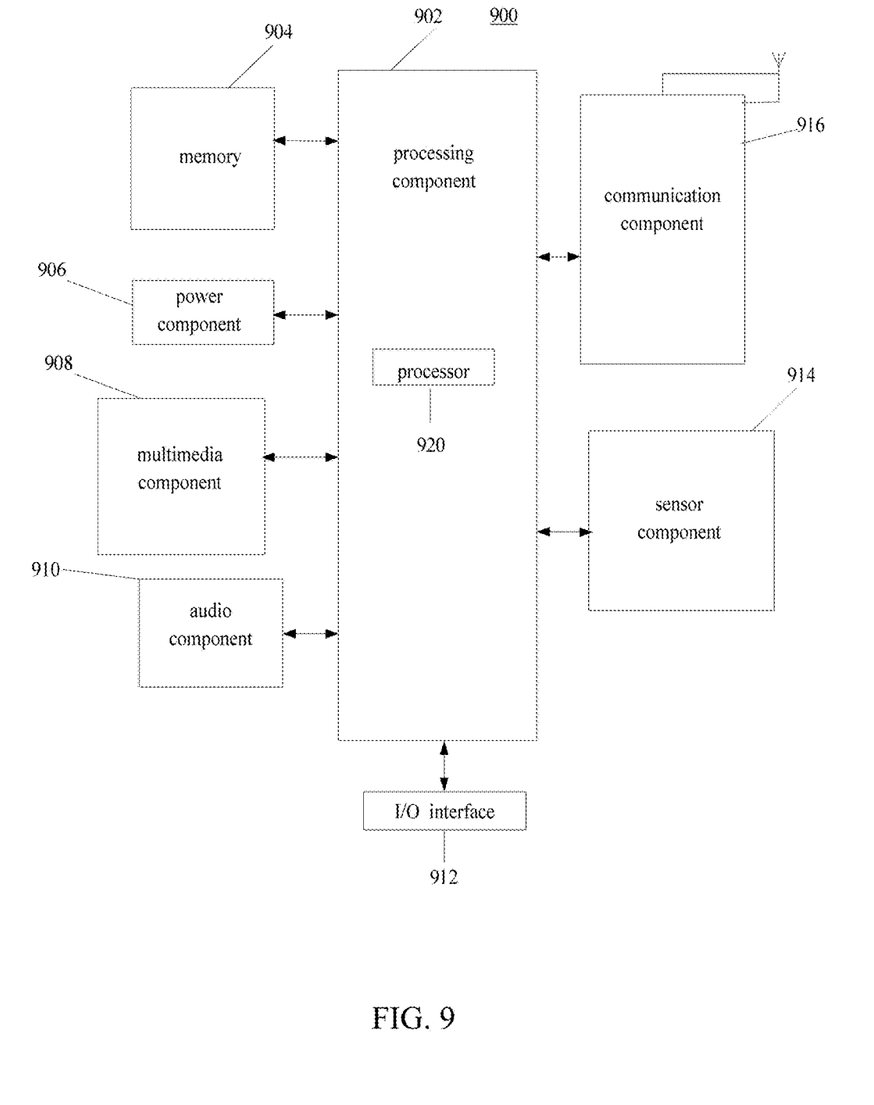
FIG. 9 is a block diagram of a device for processing videos according to an exemplary embodiment.

FIG. 9 is a block diagram of a device 900 for processing a video according to an exemplary embodiment. For example, the device 900 may be a mobile phone, a computer, a digital broadcasting terminal, a messaging device, a game console, a tablet device, a medical device, a fitness device, a personal digital assistant, and the like.

Referring to FIG. 9, the device 900 may include one or more of the following components: a processing component 902, a memory 904, a power component 906, a multimedia component 908, an audio component 910, an input/output (I/O) interface 912, a sensor component 914 and communication component 916.

The processing component 902 generally controls the overall operations of the device 900, such as operations associated with display, telephone calls, data communications, camera operations and recording operations. The processing component 902 may include one or more processors 920 to execute instructions to complete all or part of the steps of the method described above. In addition, the processing component 902 may include one or more modules to facilitate the interaction between the processing component 902 and other components. For example, the processing component 902 may include a multimedia module to facilitate the interaction between the multimedia component 908 and the processing component 902.

The memory 904 is configured to store various types of data to support operation at the device 900. Examples of such data include instructions for any application or method operating on the device 900, contact data, phone book data, messages, pictures, videos, and the like. The memory 904 may be implemented by any type of volatile or non-volatile storage device, or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

The power component 906 provides power to various components of the device 900. The power component 906 may include a power management system, one or more power sources, and other components associated with generating, managing and distributing power for the device 900.

The multimedia component 908 includes a screen that provides an output interface between the device 900 and a user. In some embodiments, the screen may include a liquid crystal display (LCD) and a touch panel (TP). In some embodiments, the screen may include an organic light-emitting diode (OLED) display or other types of displays.

If the screen includes a touch panel, the screen may be implemented as a touch screen to receive an input signal from a user. The touch panel includes one or more touch sensors to sense touch, swipe, and gestures on the touch panel. The touch sensor may not only sense the boundary of a touch or slide action, but also detect the duration and pressure related to the touch or slide operation. In some embodiments, the multimedia component 908 includes a front camera and/or a rear camera. When the device 900 is in an operation mode, such as a capturing mode or a video mode, the front camera and/or the rear camera can receive external multimedia data. Each front camera and rear camera can be a fixed optical lens system or have focal length and optical zoom capabilities.

The audio component 910 is configured to output and/or input audio signals. For example, the audio component 910 includes a microphone (MIC). When the device 900 is in an operation mode such as a call mode, a recording mode and a voice recognition mode, the microphone is configured to receive an external audio signal. The received audio signal may be further stored in the memory 904 or transmitted via the communication component 916. In some embodiments, the audio component 910 further includes a speaker for outputting audio signals.

The I/O interface 912 provides an interface between the processing component 902 and a peripheral interface module. The peripheral interface module may be a keyboard, a click wheel, a button or the like. These buttons can include but are not limited to: a home button, a volume button, a start button and a lock button.

The sensor component 914 includes one or more sensors for providing status assessment of various aspects for the device 900. For example, the sensor component 914 can detect the on/off state of the device 900 and the relative positioning of the components, such as the display and keypad of the device 900. The sensor component 914 can also detect the change of the position of the device 900 or a component of the device 900, the presence or absence of the user's contact with the device 900, the orientation or acceleration/deceleration of the device 900 and the temperature change of the device 900. The sensor component 914 may include a proximity sensor configured to detect the presence of nearby objects without any physical contact. The sensor component 914 may also include a light sensor, such as a CMOS or CCD image sensor, for the use in imaging applications. In some embodiments, the sensor component 914 may further include an acceleration sensor, a gyroscope sensor, a magnetic sensor, a pressure sensor or a temperature sensor.

The communication component 916 is configured to facilitate wired or wireless communication between the device 900 and other devices. The device 900 may access a wireless network based on a communication standard, such as Wi-Fi, 2G, 3G, 4G, or 5G, or a combination thereof. In one exemplary embodiment, the communication component 916 receives a broadcast signal or broadcast-related information from an external broadcast management system via a broadcast channel. In an exemplary embodiment, the communication component 916 further includes a near field communication (NFC) module to facilitate short-range communication. For example, the NFC module can be implemented based on radio frequency identification (RFID) technology, infrared data association (IrDA) technology, ultra wideband (UWB) technology, Bluetooth (BT) technology and other technologies.

In an exemplary embodiment, the apparatus 900 may be implemented by one or more application-specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components, and may be used to perform the above method.

In an exemplary embodiment, a non-transitory computer-readable storage medium including instructions for example a memory 904 including instructions is further provided. The instructions may be executed by the processor 920 of the device 900 to complete the above method. For example, the non-transitory computer-readable storage medium may be a read-only memory (ROM), a random-access memory (RAM), a CD-ROM, a magnetic tape, a floppy disk, an optical data storage device, and the like. when instructions in the non-transitory computer-readable storage medium are executed by a processor of a mobile terminal, the mobile terminal is caused to perform a method for processing a video, and the method includes: N videos are collected, where N is a positive integer greater than or equal to 1; at least one image frame in the N videos is selected, the image display mode of the selected at least one image frame is changed and image display data are obtained, wherein the image display data is a part of the data included in the image frame; and the image display data of selected at least one image frame with image display mode been changed are used to generate a new video.

Figure 10:
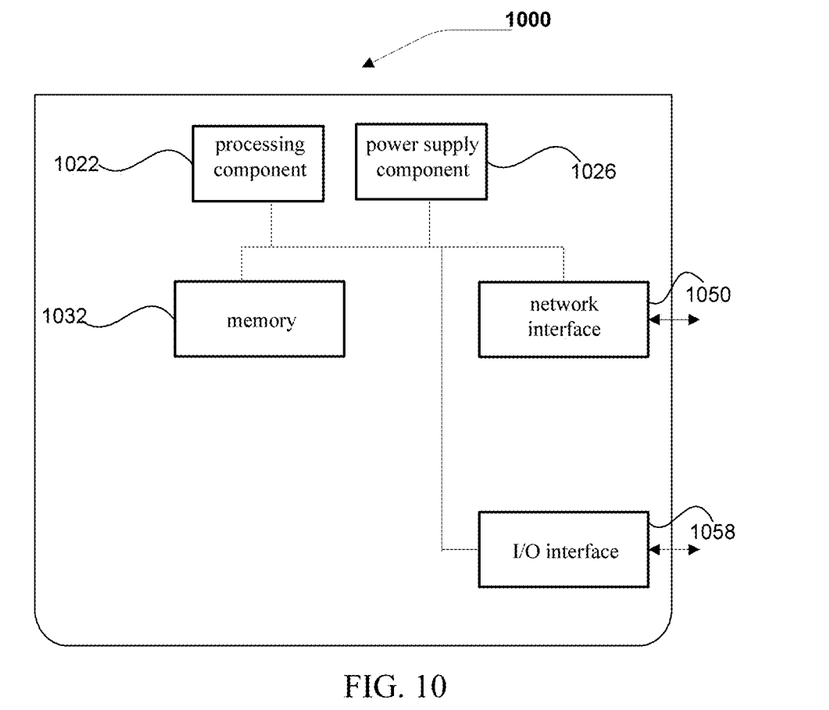
FIG. 10 is a block diagram of a device for processing videos according to an exemplary embodiment.

FIG. 10 is a block diagram of a device 1000 for processing a video according to an exemplary embodiment. For example, the device 1000 may be provided as a server. Referring to FIG. 10, the device 1000 includes a processing component 1022 which further includes one or more processors, and a memory resource represented by a memory 1032 which is used for storing instructions executable by the processing component 1022, such as an application program. The application program stored in the memory 1032 may include one or more modules and each module corresponds to a set of instructions. In addition, the processing component 1022 is configured to execute instructions to perform the above method: N videos are collected, where N is a positive integer greater than or equal to 1; at least one image frame in the N videos is selected, the image display mode of the selected at least one image frame is changed and image display data are obtained, wherein the image display data is a part of the data included in the image frame; and the image display data of selected at least one image frame with image display mode been changed are used to generate a new video.

The device 1000 may further include a power supply component 1026 configured to perform power management of the device 1000, a wired or wireless network interface 1050 configured to connect the device 1000 to a network, and an input/output (I/O) interface 1058. The device 1000 can operate based on an operating system stored in the memory 1032, such as Windows Server™, Mac OS X™, Unix™, Linux™, FreeBSD™, or the like.

Various embodiments of the present disclosure can have one or more of the following advantages.

After all or a part of image frames in videos are processed, a new video is generated by using the processed image frames, so that the generated new video has effects of moving capturing. Since the original videos collected here can be taken by keeping the camera still, the problem of the capturing effects being affected by camera shaking can be overcome, wherein the camera shaking may be caused by the users moving the camera during capturing. At the same time, due to the processing of the image frames in the videos, if a new video is generated by using the processed image frames, the new video has the effects of moving capturing. That is, the method of the present disclosure can not only overcome the problem of the capturing effects being affected due to moving the camera during image capturing, but also achieve the dynamic effects by moving image capturing.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

The above description includes part of embodiments of the present disclosure, and not limits the present disclosure. Any modifications, equivalent substitutions, improvements, etc., within the spirit and principles of the present disclosure, are included in the scope of protection of the present disclosure.

It is apparent that those of ordinary skill in the art can make various modifications and variations to the embodiments of the disclosure without departing from the spirit and scope of the disclosure. Thus, it is intended that the present disclosure cover the modifications and the modifications.

Various embodiments in this specification have been described in a progressive manner, where descriptions of some embodiments focus on the differences from other embodiments, and same or similar parts among the different embodiments are sometimes described together in only one embodiment.

It should also be noted that in the present disclosure, relational terms such as first and second, etc., are only used to distinguish one entity or operation from another entity or operation, and do not necessarily require or imply these entities having such an order or sequence. It does not necessarily require or imply that any such actual relationship or order exists between these entities or operations.

Moreover, the terms "include," "including," or any other variations thereof are intended to cover a non-exclusive inclusion within a process, method, article, or apparatus that comprises a list of elements including not only those elements but also those that are not explicitly listed, or other elements that are inherent to such processes, methods, goods, or equipment.

In the case of no more limitation, the element defined by the sentence "includes a . . . " does not exclude the existence of another identical element in the process, the method, or the device including the element.

Specific examples are used herein to describe the principles and implementations of some embodiments. The description is only used to help convey understanding of the possible methods and concepts. Meanwhile, those of ordinary skill in the art can change the specific manners of implementation and application thereof without departing from the spirit of the disclosure. The contents of this specification therefore should not be construed as limiting the disclosure.

For example, in the description of the present disclosure, the terms "some embodiments," or "example," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In the descriptions, with respect to circuit(s), unit(s), device(s), component(s), etc., in some occurrences singular forms are used, and in some other occurrences plural forms are used in the descriptions of various embodiments. It should be noted; however, the single or plural forms are not limiting but rather are for illustrative purposes. Unless it is expressly stated that a single unit, device, or component etc. is employed, or it is expressly stated that a plurality of units, devices or components, etc. are employed, the circuit(s), unit(s), device(s), component(s), etc. can be singular, or plural.

Based on various embodiments of the present disclosure, the disclosed apparatuses, devices, and methods can be implemented in other manners. For example, the abovementioned devices can employ various methods of use or implementation as disclosed herein.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

Dividing the device into different "regions," "units," "components" or "layers," etc. merely reflect various logical functions according to some embodiments, and actual implementations can have other divisions of "regions," "units," "components" or "layers," etc. realizing similar functions as described above, or without divisions. For example, multiple regions, units, or layers, etc. can be combined or can be integrated into another system. In addition, some features can be omitted, and some steps in the methods can be skipped.

Those of ordinary skill in the art will appreciate that the units, components, regions, or layers, etc. in the devices provided by various embodiments described above can be provided in the one or more devices described above. They can also be located in one or multiple devices that is (are) different from the example embodiments described above or illustrated in the accompanying drawings. For example, the units, regions, or layers, etc. in various embodiments described above can be integrated into one module or divided into several sub-modules.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

The order of the various embodiments described above are only for the purpose of illustration, and do not represent preference of embodiments.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to the disclosed aspects of the exemplary embodiments can be made in addition to those described above by a person of ordinary skill in the art having the benefit of the present disclosure without departing from the spirit and scope of the disclosure contemplated by this disclosure and as defined in the following claims. As such, the scope of this disclosure is to be accorded the broadest reasonable interpretation so as to encompass such modifications and equivalent structures.

The invention claimed is:

1. A method for video processing, comprising:
   collecting N videos, wherein N is a positive integer larger than or equal to 1;
   selecting at least one image frame in the N videos, changing an image display mode of the selected at least one image frame and obtaining image display data, wherein the image display data is a part of data included in the image frame;
   using image display data of all or a part of the image frames whose image display modes are not changed in an i-th video and image display data of all the image frames whose image display modes are changed in the i-th video, to generate a sub-video corresponding to the i-th video, wherein i=1, 2, . . . , N; and
   generating a new video by using the sub-video.

2. The method according to claim 1, wherein the image display mode comprises at least one of:
   an image zoom factor, an image display range, and an image display rotation angle.

3. The method according to claim 2, wherein
   when the image display range of the at least one selected image frame is changed, a center position point of a display frame corresponding to the image display range is caused to move along a set curve on a plane rectangular coordinate system corresponding to the image frame; and
   when an image display rotation angle of the selected at least one image frame is changed, the display frame corresponding to the image display range is caused to rotate around a set point in the display frame by a set angle in a set direction.

4. The method according to claim 1, wherein the generating the new video by using the sub-video comprises:
   taking the sub-video as the new video, when N is equal to 1; and
   composing N sub-videos into the new video in a set order, when N is greater than or equal to 2.

5. The method according to claim 1, wherein the collecting N videos comprises:
   using a video collecting device that meets at least one of the following conditions to collect the N videos:
   condition one: a capturing lens having a viewing angle range greater than a set range; and
   condition two: a capturing lens having a resolution greater than a set threshold.

6. An electronic apparatus implementing the method of claim 1, comprising a camera configured to capture the N videos, wherein the generated new video has effects of moving capturing.

7. The electronic apparatus of claim 6, wherein the N videos are captured while keeping the camera still.

8. The electronic apparatus of claim 7, wherein the electronic apparatus is a mobile phone.

9. The electronic apparatus of claim 8, wherein the camera comprises at least one of a 4K ultra-high-definition lens such that when an image of the image frame is enlarged, the image definition is still guaranteed to meet requirements for the generated new video; and an ultra-wide-angle lens such that when an image display range is changed, a viewing angle range of the lens is larger than a set range, such that different display ranges can be selected in the image of the image frame.

10. The electronic apparatus of claim 9, wherein the N videos are collected with a 4K ultra-high definition resolution and an ultra-wide angle, and the electronic apparatus is configured to automatically:
    change image zoom factors of image frames in a first video among the N videos to thereby generate a first sub-video;
    change image display ranges of image frames in a second video among the N videos to thereby generate a second sub-video;
    change image display rotation angles of image frames in a third video among the N videos to thereby generate a third sub-video;
    re-ordering the first, second, and third sub-videos to generate the new video; and
    upload the generated new video to a social media platform to show dynamic scenes as if captured at different times and places.

11. The electronic apparatus of claim 10, wherein when an image display range of an image frame in the second video are changed, a center position point of a display frame corresponding to the image display range is caused to move along a set curve on a plane rectangular coordinate system corresponding to the image frame.

12. The electronic apparatus of claim 11, wherein when an image display rotation angle of an image frame is changed, a display frame corresponding to the image display range is caused to rotate around a set point in the display frame in a set direction by a set angle.

13. A device for processing a video, wherein the device comprises:
    a processor; and
    memory storing a computer program that, when executed by the processor; causes the processor to:
    collect N videos, wherein N is a positive integer greater than or equal to 1;
    select at least one image frame in the N videos and change an image display mode of the selected at least one image frame;
    obtain image display data of an image frame whose image display mode is changed, wherein the image display data is a part of data included in the image frame;
    generate a sub-video corresponding to the i-th video by using the image display data of all or a part of the image frames whose image display modes are not changed in the i-th video, and the image display data of all the image frames whose image display modes are changed in the i-th video, where i=1, 2, . . . , N; and
    generate a new video by using the sub-video.

14. The device according to claim 13, wherein the image display mode comprises at least one of:
    an image zoom factor, an image display range, and an image display rotation angle.

15. The device according to claim 14, wherein the computer program further causes the processor to:
    cause a center position of a display frame corresponding to the image display range to move along a set curve on a plane rectangular coordinate system corresponding to the image frame, when the image display range of the selected at least one image frame is changed; and
    cause the display frame corresponding to the image display range to rotate around a set point in the display frame in a set direction by a set angle, when the image display rotation angle of the at least one selected image frame is changed.

16. The device according to claim 13, wherein the computer program further causes the processor to:
   take the sub-video as the new video, when N is equal to 1; and
   compose N sub-videos into the new video in a set order, when N is greater than or equal to 2.

17. The device according to claim 13, wherein the computer program further causes the processor to:
   use a video collecting device that meets at least one of the following conditions to collect the N videos:
   condition one: a capturing lens having a viewing angle range greater than a set range; and
   condition two: a capturing lens having a resolution greater than a set threshold.

18. A non-transitory computer-readable storage medium, when a computer program stored in the storage medium are executed by a processor of a mobile terminal, causes the processor to:
   collect N videos, wherein N is a positive integer larger than or equal to 1;
   select at least one image frame in the N videos, change an image display mode of the selected at least one image frame and obtain image display data, wherein the image display data is a part of data included in the image frame;
   generate a sub-video corresponding to the i-th video by using the image display data of all or a part of the image frames whose image display modes are not changed in the i-th video, and the image display data of all the image frames whose image display modes are changed in the i-th video, where i=1, 2, . . . , N; and
   generate a new video by using the sub-video.

* * * * *